Oct. 13, 1931.  W. BEAUREGARD  1,826,863
DUCT TERMINAL
Filed July 16, 1927
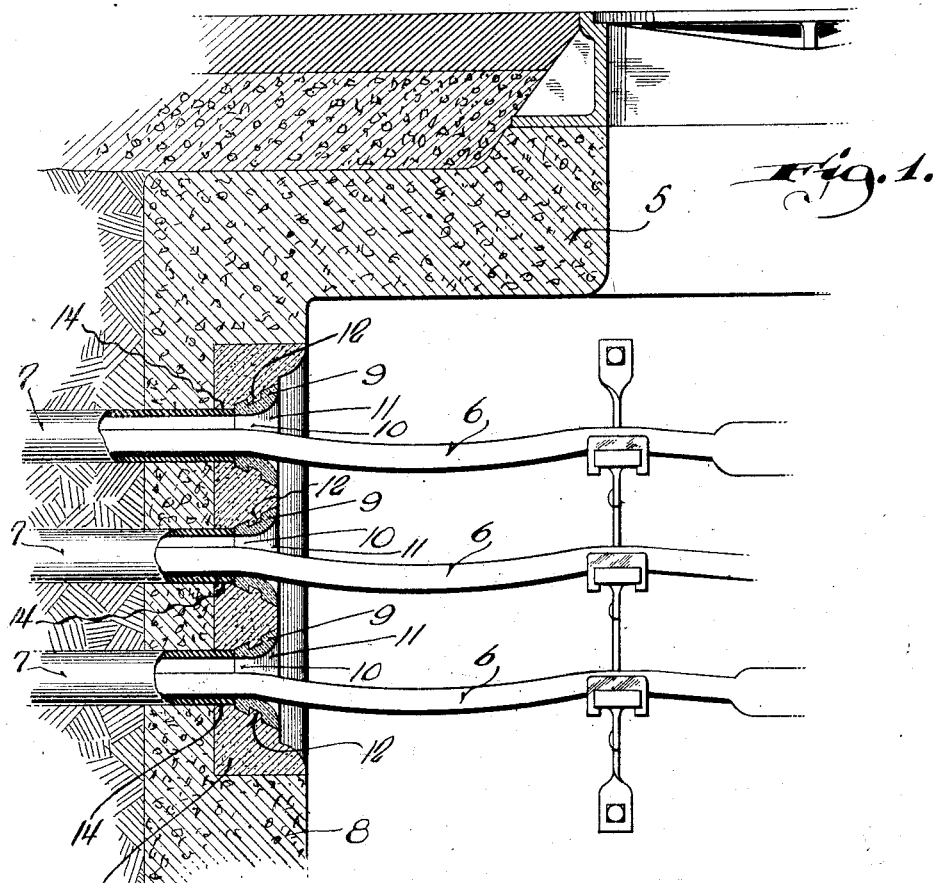
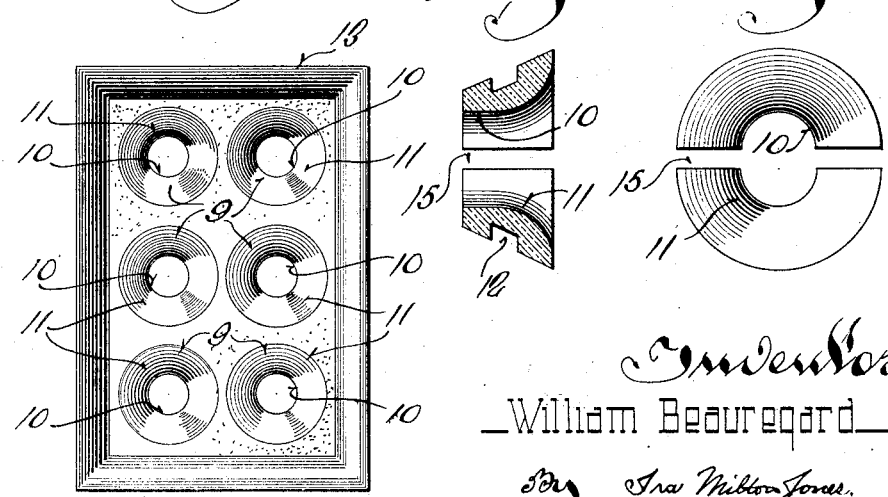
Inventor
William Beauregard
By Ira Milton Jones
Attorney Patented Oct. 13, 1931

1,826,863

UNITED STATES PATENT OFFICE

WILLIAM BEAUREGARD, OF FALL RIVER, MASSACHUSETTS, ASSIGNOR, BY MESNE ASSIGNMENTS, TO LINE MATERIAL COMPANY, OF SOUTH MILWAUKEE, WISCONSIN, A CORPORATION OF DELAWARE

DUCT TERMINAL

Application filed July 16, 1927. Serial No. 206,219.

The present-day underground cable installations include ducts or conduits of fiber or other suitable material which terminate at the wall of a man-hole or other central point and heretofore the duct has merely ended abruptly in line with the inner plane of the wall, presenting a more or less sharp edge, on which the cable is worn or cut at the time it is pulled through the duct, and during the constant expansion and contraction thereof, and this invention has as an object, the provision of an improved duct terminal whereby a rounded smooth surface surrounds the end of the duct to prevent wearing and cutting of the cable.

Another object of this invention resides in the provision of an improved duct terminal member formed of porcelain or other suitable smooth surface material adapted to be embedded in the wall of the man-hole in alignment with the duct proper and having its inner diameter corresponding to that of the inside diameter of the duct with the outer end of the bore flared and rounded so that the cable may drag or slide thereover without injury.

Another object of this invention resides in the provision of an improved device wherein a series of terminal members are embedded in a precast block or plate and spaced so as to correspond to the spacing between the adjacent ends of the ducts, whereby the block may be readily set within the mold or form of the man-hole prior to its being poured to form a rigid support for the ducts and to insure their proper spacing as well as provide the desired terminal to protect the cable against wear.

Still another object of this invention resides in the provision of an improved duct terminal of the character described which is readily applicable to cable ducts now in use and to ducts at the time of their installation.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best mode I have so far devised for the practical application of the principles thereof, and in which:

Figure 1 is a sectional view through a portion of a man-hole equipped with my improved duct terminals, parts being in section and parts in elevation.

Figure 2 is a front plan view of a series of duct terminals cast or formed in a block or plate prior to installation within a man-hole.

Figure 3 is a sectional view taken through a slightly modified type of duct terminal, and Figure 4 is a front plan view of the modified terminal structure.

Referring more particularly to the accompanying drawings in which like numerals will designate like parts throughout the several views, the numeral 5 designates generally a man-hole or other structure from which one or more underground cables 6 lead through ducts or conduits 7. Heretofore the ducts 7 have terminated abruptly at the inner surface of the side walls 8 of the man-hole and as a result presented a rather abrupt or sharp edge to the cables causing them to be cut as they were drawn therethrough and during the constant expansion and contraction thereof after being installed, frequently breaking through the outer surface of lead or other material and exposing the wires, often causing short circuits.

This invention contemplates the elimination of these sharp cutting edges by the provision of duct terminal members 9, formed of porcelain, or any other suitable material having a comparatively smooth surface and having a bore 10 of a diameter corresponding to the bore of the ducts and being flared and rounded outwardly as at 11, so that a smooth surface free of cutting edges or corners is presented to the cables as will be readily apparent. The terminals 9 are secured within the wall 8 of the man-hole and are therefore rigid with reference to the ducts to prevent the disalignment of one with reference to the other.

Each of the terminal members 9 preferably has a groove or recess 12 into which the surrounding cement or concrete fills to insure its proper retention in the wall and where the terminal members are installed at the time of construction of the man-hole, a series of terminals 9 are preferably precast in a block or plate 13 spaced apart in the manner in which it is desired to space the ducts 7 with a bore or opening 14 extending rearwardly therefrom, and of a diameter to correspond with the outside diameter of the duct, so that the ends of the ducts may be inserted in the bores 14 and the plate 13 held in the mold in any desired manner while the walls 8 pored; the plate 13 providing a rigid support for the ducts and insuring the proper alignment thereof with the terminal members.

Where it is desired to equip old installations with the improved terminal member, the terminal members will be split as at 15, so that they may be engaged over the cables and the wall of the man-hole surrounding the duct cut away, to allow the split terminal member to be inserted in place and then cemented in position.

From the aforegoing description, taken in connection with the accompanying drawings, it will be readily apparent to those skilled in the art to which an invention of the character described appertains, that I have provided a novel and improved terminal for underground cable ducts which will prevent wear and tear on the cables and which will also provide means for assisting in securing the ends of the ducts in the walls of a man-hole at the time of their installation.

What I claim as my invention is:

1. In a device of the character described a member adapted to form part of a wall with one face flush with the front of the wall and having a two diameter bore, the bore of the larger diameter being at the rear of the member, and the bore of the smaller diameter being flared and rounded to the front of the member, said bore of larger diameter receiving the adjacent end of a cable conduit of an outside diameter to fit therein and having an inside diameter corresponding with the diameter of the bore of less diameter.

2. In a device of the character described a member adapted to form part of a wall with one face flush with the front of the wall and having a series of two diameter bores, the bores of the larger diameter being at the rear of the member, and the bores of the smaller diameter being flared and rounded to the front surface of the member, said bores of larger diameter receiving adjacent ends of cable conduits of an outside diameter to fit therein and having inside diameters corresponding with the bores of less diameter, and said member serving to support the conduits.

3. In combination with a conduit, a duct terminal member of substantially spool shape and having an outwardly flared smooth bore, and a mounting member cast around the duct terminal, the mounting member having an opening in axial alignment with the duct terminal to receive the end of the conduit and anchor the same in proper alignment with the duct terminal, and the outwardly flared bore being substantially tangential to the front of the mounting member.

4. In combination with a conduit, a duct terminal member of substantially spool shape in axial alignment with the conduit and having an outwardly flared smooth bore, a mounting member cast around the duct terminal and a portion of the conduit, whereby the conduit and the duct terminal are rigidly held against relative movement, and the outwardly flared bore of the duct terminal being tangential to the front of the mounting member.

5. The combination with a cable duct having an end embedded in a wall and over which the cable drags as it moves through the duct, of a duct terminal adapted to be embedded in the wall in alignment with the duct to form the outer end thereof, said duct terminal comprising a tubular substantially spool shaped member having an internal diameter equal to that of the conduit to form an unbroken continuation thereof, and being flared outwardly throughout its entire circumference to present a smooth rounded surface over which the cable moves without injury.

6. A duct terminal of the character described, adapted to be embedded in a wall at any point to align with a cable conduit behind the wall with an end portion anchored in the wall, comprising, a tubular substantially spool shaped member formed of insulating material and having its bore flared outwardly throughout its entire circumference to be substantially tangential with the front of the wall when embedded therein, and anchor means formed on the outer surface of the tubular member to facilitate its securement in the wall.

In testimony whereof I have hereunto affixed my signature.

WILLIAM BEAUREGARD.